(12) United States Patent
Bonola (10) Patent No.: US 6,370,606 B1
(45) Date of Patent: Apr. 9, 2002

(54) SYSTEM AND METHOD FOR SIMULATING HARDWARE INTERRUPTS IN A MULTIPROCESSOR COMPUTER SYSTEM

(75) Inventor: Thomas J. Bonola, Tomball, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/186,558

(22) Filed: Nov. 5, 1998

(51) Int. Cl.$^7$ .............................................. G06F 13/00
(52) U.S. Cl. ........................ 710/260; 709/102; 710/129; 712/40
(58) Field of Search ................................ 709/100, 102, 709/103, 104, 105, 106; 710/67, 129, 130, 260, 264; 712/40

(56) References Cited

U.S. PATENT DOCUMENTS

| | | | | |
|---|---|---|---|---|
| 5,121,472 A | * | 6/1992 | Danish et al. ................. | 710/67 |
| 5,129,064 A | * | 7/1992 | Fogg et al. .................... | 703/25 |
| 5,303,378 A | * | 4/1994 | Cohen .......................... | 710/264 |
| 5,778,242 A | * | 7/1998 | Wong ............................ | 712/40 |
| 5,995,741 A | * | 11/1999 | Bonnet et al. ................. | 703/21 |
| 6,203,396 B1 | * | 7/2001 | Cottle et al. ................. | 710/263 |

OTHER PUBLICATIONS

Mendel, Brett; "Server I/O all set to flow"; *Lantimes*, Oct. 27, 1997, vol. 14, Issue 22; cover page and p. 31.
Briggs, Chris; "Smarter and Faster I/O for Servers"; CORE: Operating Systems; *Byte*, May 1, 1996, vol. 2, No. 5.
Thompson, Tom; "I2O Beats I/O Bottlenecks"; *Byte*, Aug. 1997, pp. 85, 86 and 3 additional pages.
I2O Introduction; Technology Backgrounder; Aug. 13, 1997; http:www.i2osig.org/Architecture/TechBack.html.
I960®RP I/O Processor—the I2O SIG site; http://134.134.214.1/design/iio/i2osig.html; Feb. 6, 1998.
"Welcome to the I2O SIG® Web Site!"; http://www.i2osig.org; Feb. 6, 1998.
"About I2O Technology"; http://www.i2osig.org/Architecture; Feb. 6, 1998.
"Technology Backgrounder"; http://www.i2osig.org/Architecture/TechBack.html; Feb. 6, 1998; 6 pages.
"Questions and Answers"; http://www.i2osig.org/Architecture/QandA.html; Feb. 6, 1998; 4 pages.
"I2O® Specifications For Non–Members"; http://www.i2osig.org/Architecture/GetSpec.html; Feb. 6, 1998.
Amdahl, Carlton G.; "I2O Future Directions"; http://www.i2osig.org; Jun. 1996; 12 pages.
Goble, Scott, et al.; "Intelligent I/O Architecture"; http://www.i2osig.org; Jun. 1996; 22 pages.

(List continued on next page.)

*Primary Examiner*—Majid A. Banankhah
(74) *Attorney, Agent, or Firm*—Fletcher, Yoder & Van Someren (57) ABSTRACT

A technique for providing hardware interrupt simulation using the interprocessor interrupt mechanism of the local Advanced Programmable Interrupt Controller (APIC) on a Symmetric Multiprocessor (SMP) System running Windows NT is disclosed. The interrupt simulation is performed by first determining the Interrupt Request (IRQ) vector that is associated with a particular system device driver. In the case of devices being emulated, the determination of the IRQ vector is done by intercepting the messages from the interrupt invoking procedure. The IRQ vector provides a pointer to the device driver's Interrupt Service Routine (ISR). After the device driver's ISR is connected to the appropriate interrupt vector entry in the Interrupt Descriptor Table (IDT), the vector number is combined with the local APIC constant and followed by a 32-bit write operation into the lower part of the Interrupt Control Register (ICRL) of the local APIC.

20 Claims, 11 Drawing Sheets

OTHER PUBLICATIONS

"Press Releases and Clips"; http://www.i2osig.org/Press; Feb. 6, 1998; 4 pages.

Listing of Press Releases ; http://altavista.digital.com/cgi-bin/quer . . . =21%2FMar%2F86&d1=&search.x=46&search.y=6; Feb. 6, 1998; 2 pages.

Crothers, Brooke; "Intel server chip gets big backing"; Oct. 7, 1997; http://www.news.com/News/Item/0,4,14962,00.html; Feb. 6, 1998.

"HP Demonstrates Commitment to I2O Standard With New I2O Disk–array Controller"; *Hewlett Packard;* Press Release, Atlanta, Oct. 8, 1997; http://hpcc920.external.hp.com/pressrel/oct97/08oct97b.html; Feb. 6, 1998; 2 pages.

"I2O: Disaster in the making for the freeware community"; http://22.kenandted.com/i2o/disaster.html; Feb. 6, 1998; 2 pages.

\* cited by examiner

SYSTEM AND METHOD FOR SIMULATING HARDWARE INTERRUPTS IN A MULTIPROCESSOR COMPUTER SYSTEM

DESCRIPTION

1. Technical Field of the Invention

The invention relates to the field of advanced interfaces for input-output devices of a computer system, and more particularly, to a technique for simulating hardware interrupts in a multiprocessor computing environment especially while emulating hardware devices using software modules that are compliant with the Intelligent Input-Output (I2O) standard.

2. Description of Related Art

The use of personal computers has expanded remarkably in recent years. Modern personal computers are generally characterized by a flexible hardware architecture and a relatively open software architecture. The use of standardized bus architectures (such as the PCI Bus and the Fibre Channel) has permitted users to customize their personal computers to meet their particular hardware and software needs. In consequence, a variety of input and output devices are available for most popular personal computers.

As the computational power of personal computers has grown, in many instances, high-end personal computers have become relatively indistinguishable from servers and workstations. Certain workstations are being powered by multiple microprocessors. The predominant difference between personal computers and workstations are the different operating systems that are commonly used in the two environments. On personal computers, the Microsoft Windows environment is currently the dominant operating system. In contrast many servers and workstations use variants of the Unix operating system (e.g., the Solaris operating system used on Sun workstations). Increasingly, there has been demand in the marketplace for multiprocessor machines that run under Microsoft's Windows NT 32-bit operating system.

As mentioned earlier, one of the reasons for the growing popularity of personal computers, servers and workstations has been their capability for customization. Modern personal computers, servers and workstations can be customized in terms of both their hardware as well as their software. From a hardware viewpoint, the customization of personal computers, servers and workstations most commonly involves the selection and installation of one or more specialized input-output devices, e.g., keyboards, monitors, printers, storage devices, etc. From a software viewpoint, personal computers, servers and workstations are customized by installing and integrating various application programs.

It has been found desirable by both vendors as well as consumers to have a large selection of reliable input/output (I/O) devices. The availability of such a wide range of input-output devices increases the size of the market of potential purchasers of such devices by providing the customization capabilities desired by a larger pool of potential purchasers. Furthermore, it has been found desirable for input-output devices to embody a greater degree of "intelligence." Thus, for example, it would be desirable for each input-output device to be able to perform its function without needing active supervision or interaction with the central processing units (CPUs) of the computer system.

Most input-output devices generate responses and initiate communications with the CPU by generating an interrupt either in hardware or in software. Such an interrupt typically causes the CPU to suspend execution of whatever task it is currently executing in order to respond to the I/O device generating the interrupt. It has been recognized by experts in the field that one of the most significant reasons for the reduction in the performance of computer systems is the performance impact resulting from input-output interrupts to the CPU.

Another key problem area in I/O processing is the current necessity of creating, testing, integrating and supporting unique device drivers for each combination of I/O device and operating system that a vendor desires to support. For example, it has been reported that the recently-introduced Microsoft Windows98 operating system has been bundled with over 1200 device drivers. It has therefore been found desirable to find techniques for implementing cross-platform intelligent I/O that can broaden the availability and application of reliable, intelligent I/O devices.

It has also been found desirable to have a methodology and a standardized architecture for intelligent I/O in which low-level interrupts can be off-loaded from the CPU to one or more dedicated I/O processors (IOPs) that have optimized to handle I/O tasks. It would also be useful if multiple independent IOPs could communicate with each other and with the CPUs using a message-passing protocol. The development of a standardized intelligent I/O architecture would greatly improve I/O and CPU performance in high-bandwidth applications such as networked video, groupware and client/server processing.

It has also been found desirable to have an architectural model that does not constrain the processor upon which a specific I/O task executes and can thus be implemented on a single-processor, multiprocessor or clustered computer system. With the proliferation of network operating systems (such as NetWare 4, Windows NT Server and UnixWare), the number of device drivers that need to be written, tested, integrated and supported has vastly expanded. This is because the traditional technique for writing device drivers requires vendors to create a new device driver for every unique combination of operating system and hardware device that is to be supported.

It has therefore been found desirable to define a development environment for creating device drivers that are portable across multiple operating systems and host platforms. It would further be desirable if the task of creating, testing, integrating and supporting unique device drivers for every combination of operating system and device could be reduced by defining a standard interface and having the operating system designer and the device manufacturer share the task of writing and debugging each device driver.

It is thus desirable for an operating system vendor to be able to write a single device driver for each class of device that is compatible with a standardized device driver interface. Likewise, it has also been found desirable for the manufacturer of an I/O device to be able to write a single standardized device driver for the I/O device that may be used with any operating system supporting the I2O interface standard. Such an open, standards-based approach to device driver design can facilitate the rapid development of a new generation of portable and intelligent I/O solutions for personal computers and workstations.

It has further been found desirable to be able to emulate hardware devices in software while complying with the I2O interface standard. It would be an additional advantage if such emulation could be facilitated on computer systems embodying a multiprocessor architecture and running under the Microsoft Windows NT operating system.

SUMMARY OF THE INVENTION

In one aspect, the present invention is a mechanism for simulating a hardware interrupt on one microprocessor while a corresponding input/output (I/O) device is emulated in software on a different microprocessor in the same computer system. The emulated I/O device is controlled by a modular device driver. The modular device driver is based upon the Intelligent Input/Output (I2O) split device driver development model in which the functionality of a device driver is partitioned into at least two software modules, one of which is an operating-system-specific Operating System Services Module (OSM) while another is an I/O-device-specific Hardware Device Module (HDM). A single computer system may have multiple OSMs and/or HDMs.

The I2O split driver model defines a standardized messaging protocol for intercommunication between associated pairs of OSM and HDM software modules. Messages from one or more of the OSMs are maintained in an inbound message queue while messages from one or more of the HDMs are maintained in an outbound message queue. Messages between the various software modules are exchanged over a shared communications layer.

In another aspect, the present invention is a technique for providing hardware interrupt simulation using the Interprocessor Interrupt (IPI) mechanism of the local Advanced Programmable Interrupt Controller (APIC) on a Symmetric Multiprocessor (SMP) System running the Microsoft Windows NT operating system. The hardware interrupt simulation is performed by first determining the Interrupt Request (IRQ) vector that is associated with a specific system device driver. In the case of a device being emulated, this determination of the IRQ vector is done by intercepting the messages from the interrupt invoking procedure.

The IRQ vector provides a pointer to the device driver's Interrupt Service Routine (ISR). After the device driver's ISR has been connected to the appropriate interrupt vector entry in the Interrupt Descriptor Table (IDT), the vector number is combined with the local APIC constant and followed by a 32-bit write operation into the lower part of the Interrupt Control Register (ICRL) of the local APIC.

BRIEF DESCRIPTION OF THE DRAWINGS

A more complete understanding of the method and system of the present invention may be obtained by reference to the detailed description of the preferred embodiment(s) that follow, taken in conjunction with the accompanying drawings, wherein.

DESCRIPTION OF THE PREFERRED EMBODIMENT

From a hardware perspective, a typical computer system comprises a processing unit connected to a display via a display connection. The processing unit is also connected to a variety of input/output devices such as a keyboard and/or a modem. The processing unit may have one or more microprocessors as discussed below.

From a software perspective, a typical computer system comprises a variety of software elements having a hierarchical relationship amongst each other.

It is a characteristic of a computer system that some or all of its hardware components are controlled and managed by a user through software. The software that serves as the interface between an operating system and a specific item of physical hardware is conventionally referred to as a device driver.

Figure 1:
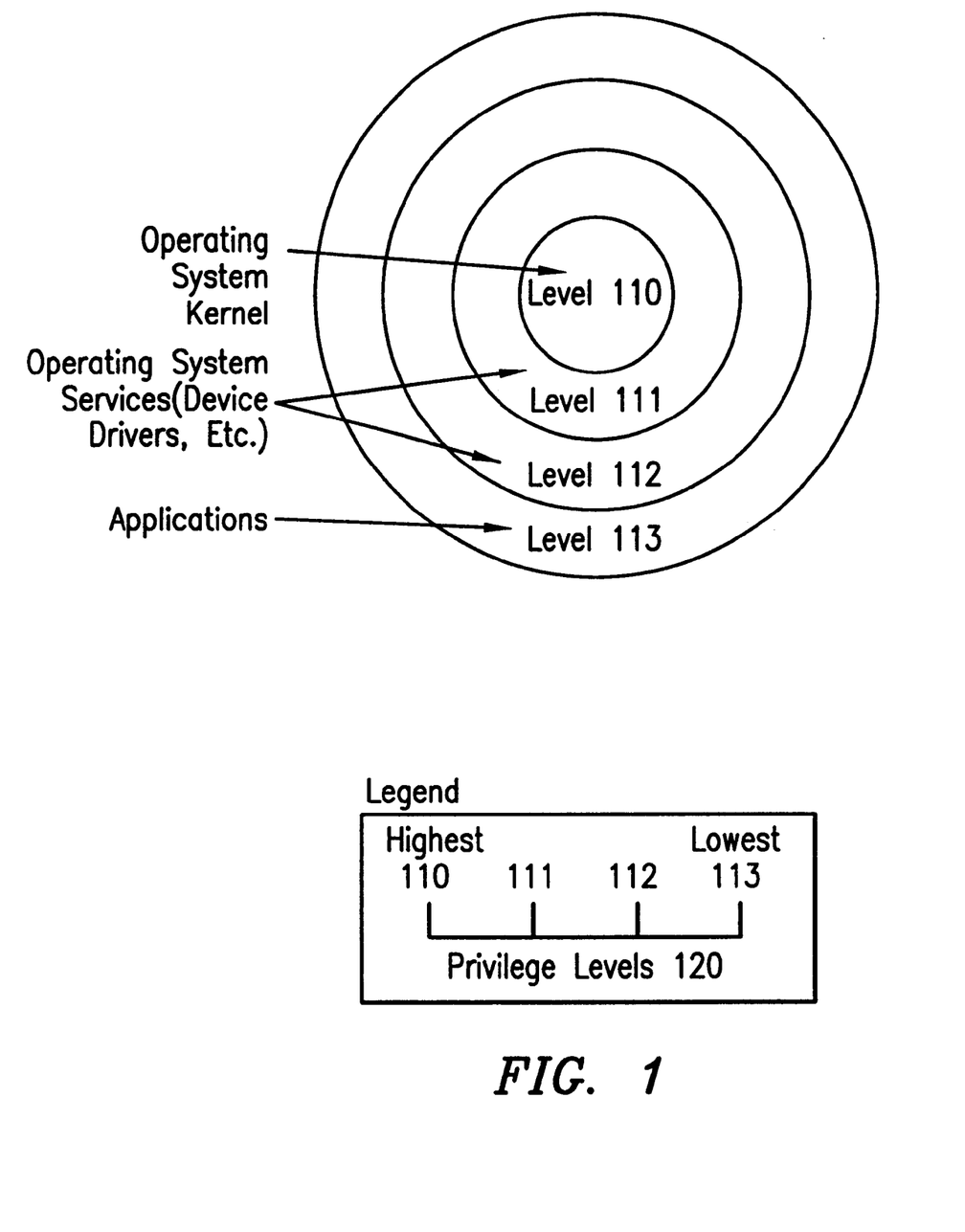
FIG. 1 shows the four privilege levels that are supported by the current generation of Intel microprocessors.

The reliability of an operating system can be improved by distinguishing between various types of software that run under the control of the operating system. One way to permit such a distinction is to use a hierarchical set of privilege levels. FIG. 1 shows the four privilege-level protection mechanism incorporated in recent microprocessors of the Intel family. The four privilege-levels recognized by Intel microprocessors are numbered from 0 to 3, as represented by elements 110 to 113 with lower numbers correlating to higher privilege levels. The legend at the bottom left of FIG. 1 depicts the relationship between the various privilege levels 110–113.

In an exemplary implementation depicted in FIG. 1, the highest privilege level 110 (at the center of the diagram) is used for segments that contain the most critical code modules in the system, usually the kernel of an operating system. The outer rings 111–113 (each of which have progressively lower privileges) are used for segments that contain code modules for less critical software. Code modules belonging to lower privilege segments are permitted to access modules operating at higher privilege segments by means of a tightly controlled and protected interface called a "gate". Attempts to access higher privilege segments without going through a protection gate and without having sufficient access rights results in the generation of a general-protection exception (GPE) or general-protection fault (GPF).

The operating system of a computer uses the kernel as a gateway to the hardware of the computer system. The operating system typically comprises a number of modules associated with different operating system functions. The operating system is invoked by one or more application programs through various Application Program Interfaces (APIs) that act as a gateway to the operating system. One class of functionality that is often a part of an operating system is device drivers for various I/O devices, e.g., pointing devices, screen displays, storage devices, network connection, etc.

A printer driver is typically a specialized software element that interprets each print request received by the operating system and adapts the print request to the specific configuration and capabilities of a particular printing device. Likewise, a display driver is typically a specialized software element that interprets display requests issued by the operating system and adapts the display requests to the configuration and capabilities of a specific monitor or other display device. Device drivers are either bundled with the operating system as part of a standard distribution, or may be added later by a user after purchasing and installing a specific I/O device. For example, as previously mentioned the recently released Microsoft Windows98 operating system has been reported to have included over 1200 device drivers.

Figure 2:
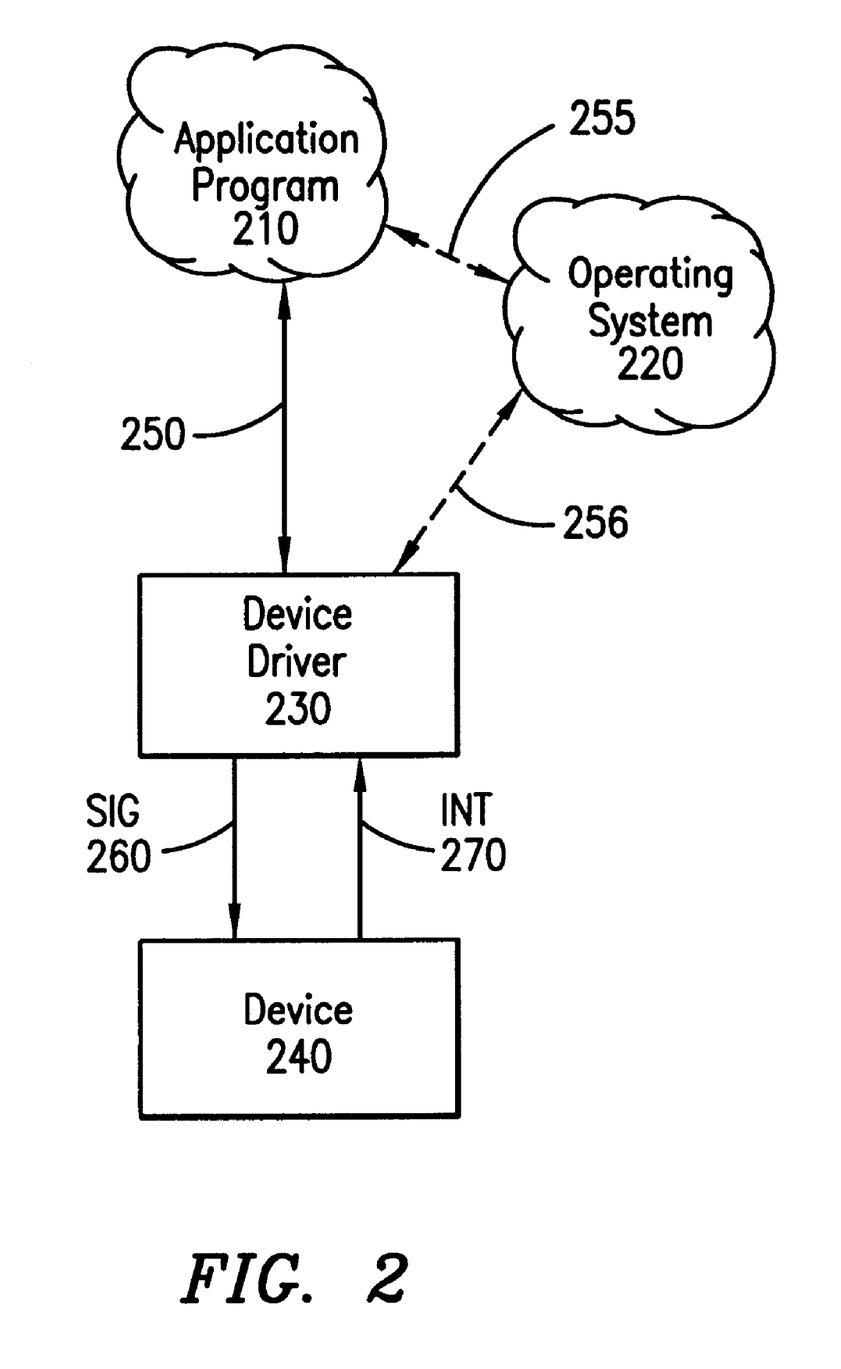
FIG. 2 is a high-level block diagram of a device driver.

As noted earlier, an application program 210 invokes a hardware device 240 using a device driver 230. The device driver 230 is a piece of software that is responsible for directing the operation of the device 240, gathering the completed results and obtaining status information about the device 240 or the delegated task. The application program 210 typically communicates with the device driver 230 either directly (as shown at 250) or indirectly through the operating system 220 (as shown at 255 & 256).

A device driver has at least two different contexts in which it operates. The first context is where the various hardware and I/O devices of a computer system are queried at the start-up of the computer both to obtain the latest status information and optionally to test their continued proper operation. This first context is generally referred to as the "initialization" phase of the device driver 230. During initialization, a device driver may optionally query the hardware device 240 (that it is responsible for controlling) to obtain identifying information about the device 240. In one embodiment, this identifying information comprises the vendor ID and the device ID of the hardware device 240.

In the Windows NT operating system environment, the identification information that is obtained by the device driver 230 (from the device 240 or from stored user input) is stored for later reference and also used to customize the operation of the operating system. The identifying information about the various devices is typically stored in a data structure called the registry. The use of a standardized hardware configuration registry permits various application programs to be able to customize or tailor their operations based upon the specific configuration of the computer system at run time. It should be noted that initialization is typically performed once per session in most operating systems.

Another context in which a device driver works is the execution mode of operation. This is the dominant context in which a device driver operates. In the execution mode, a device driver 230 actively controls a hardware device 240 as directed by an application program 210.

As can be seen, in the execution mode, a device driver 230 sends a work request to the hardware device 240 using electrical, optical and/or mechanical signals 260. When the device 240 has completed the requested task, it returns an asynchronous signal 270 to the device driver 230. Most commonly, this asynchronous signal 270 is a hardware interrupt. The handling of hardware interrupts is discussed elsewhere in this patent application. It should be noted that a status query to the device 240 regarding a work request from the device driver 230 is handled in an analogous manner.

Unlike the flow of work requests from an application program 210 via the CPU to the device driver 230 and thence to the device 240, the return information path from the device 240 cannot be implemented as a series of sequential procedure calls or relayed messages. This is because a hardware device 240 cannot make a function call into the device driver 230 and execute the function upon the successful completion of the work request received by the device 240.

Typically, the device 240 uses the device driver 230 to place the results of the work request or status inquiry in the form of a data structure in the general memory of the computer system. The device driver 230 then generates an interrupt and then informs the invoking software module of the completion of the work request or status inquiry. Thus, the responsive communication from the device 240 results in the device driver 230 having to execute a specialized software module called an interrupt routine service (ISR).

A typical computer system has multiple I/O devices. Typically, each of these devices is associated with a particular interrupt request (IRQ) line. Upon startup, the operating system loads an interrupt descriptor table (IDT) that contains a pointer to the software code that is responsible for handling each particular IRQ.

Prior to a detailed discussion of the specifics of the present invention, it would be useful to briefly review certain aspects of the I2O split device driver model and to summarize salient features of the Intel microprocessor architecture in order to permit a better understanding of the present invention.

Conventional Device Drivers

Figure 3:
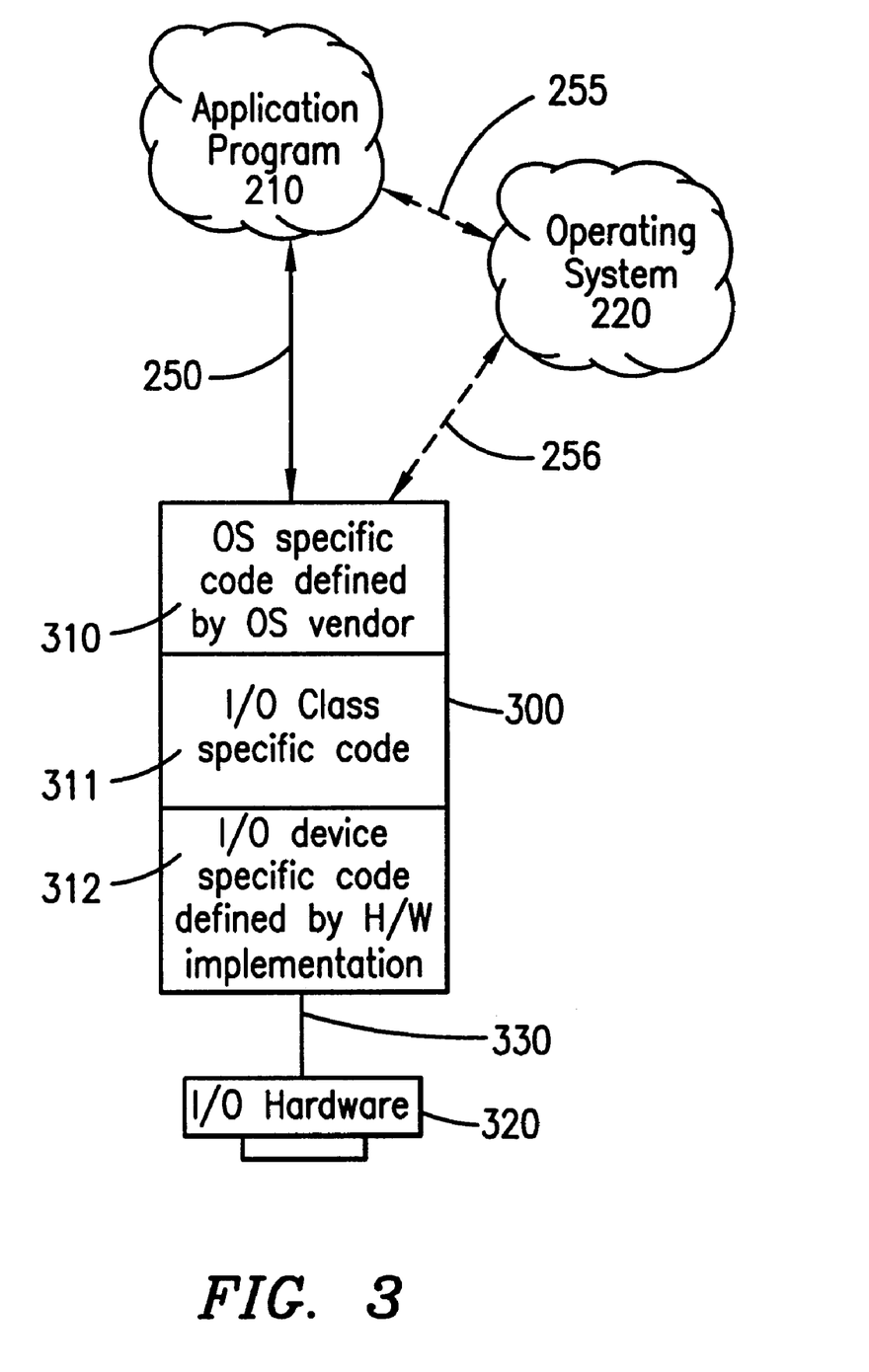
FIG. 3 is an overview diagram of the internal structure of an exemplary conventional I/O device driver.

FIG. 3 is an overview diagram of the internal structure of an exemplary conventional I/O device driver. As shown in FIG. 3, a hardware I/O device 320 is controlled by a software device driver 300 over a communications link 330. The communications link is typically either a computer bus or a specialized access channel for the I/O device 320.

As shown in FIG. 3, an application program 210 invokes the conventional device driver 300 either directly (as shown at 250), by communicating with the device driver using a message or a procedure call, or indirectly (as shown at 255 & 256), by routing the invocation of the device driver through the operating system 220. Likewise, the responsive communications from the conventional device driver 300 back to the invoking application program 210, can also be direct (i.e., by bypassing the operating system 220) or indirect (i.e., by routing through the operating system 220).

The conventional device driver 300 further comprises software program instructions that may be classified into at least three groups. First, some part of the device driver comprises computer code 310 that is specific to the operating system of a host computer. The requirements of such operating-system-specific code 310 is typically defined by the operating system vendor. Second, the software device driver 300 also comprises some computer code 311 that is specific to a class of input-output devices. Third, the device driver 300 also comprises computer program instructions 312 that are specific to the I/O device 320 as defined by the hardware implementation.

The I2O Split Driver Model

The design, development, testing, integration and support of device drivers can be considerably simplified by separating the portion of the device driver that is specific to a particular operating system from the portion that is specific to a particular host CPU or IOP. FIG. 3 is a high-level overview diagram of a split-driver model for creating device drivers that are portable across multiple operating systems and host platforms.

As noted earlier, the split I2O device drivers are composed of two parts: an Operating System Services Module (OSM) and a Hardware Device Module (HDM). The OSM resides on, and interfaces with, the host operating system. The HDM resides on and interfaces with the adapter that is managed by the appropriate device driver. This pair of modules interface with each other through a communication system that is comprised of two layers: a message layer and a transport layer. The message layer sets up a communication session while the transport layer defines how information is to be shared amongst the various modules. Much like any standard communications protocol, the message layer resides on top of the transport layer.

Figure 4:
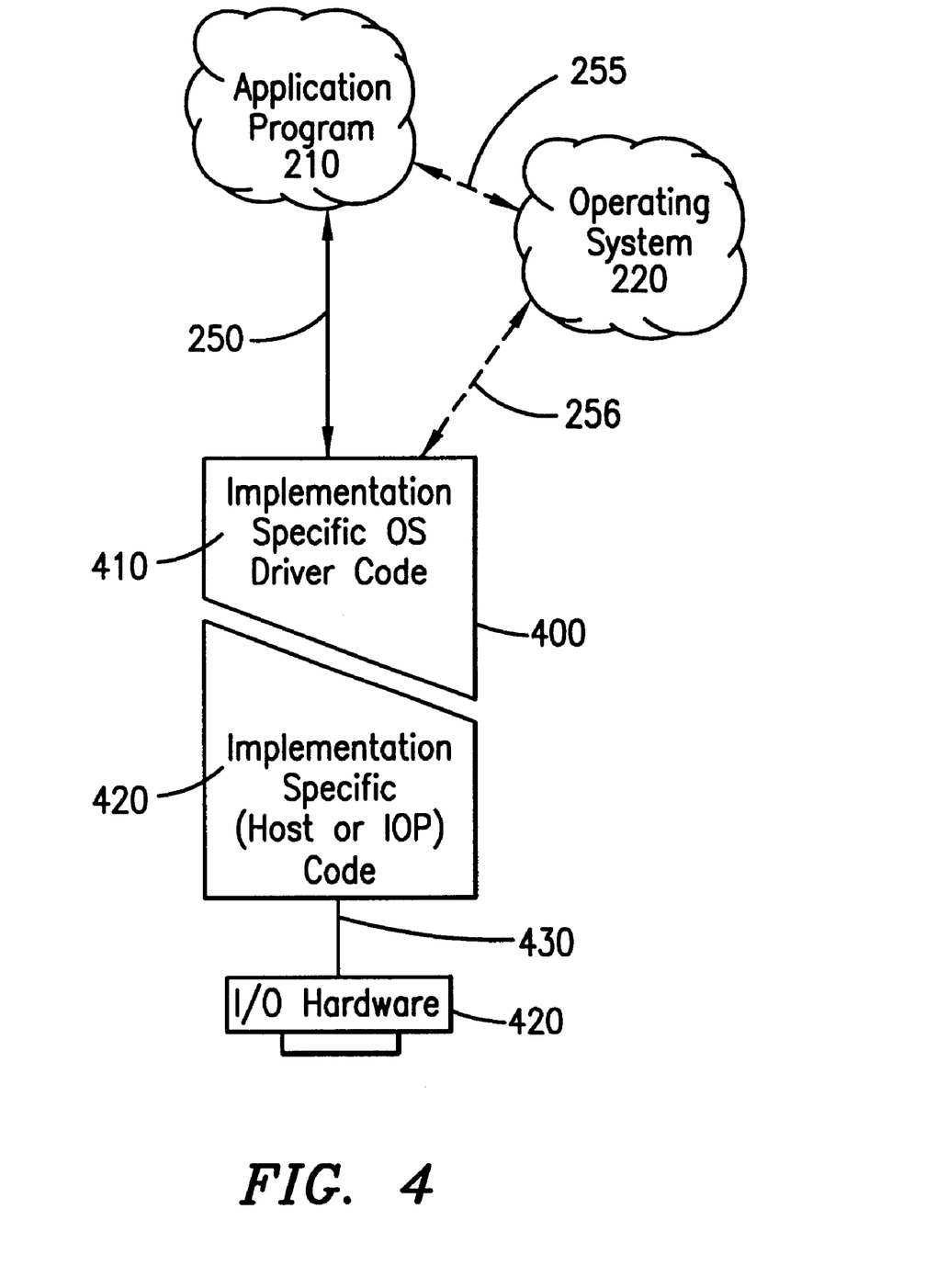
FIG. 4 is a high-level overview diagram of the split-driver model for creating device drivers that are portable across multiple operating systems and host platforms.

As shown in FIG. 4, the device driver 400 communicates with the I/O hardware 420 over a communications link 430. The device driver 400, in turn, comprises an implementation-specific operating system device driver code 410 and some device driver code 420 that is specific to the host CPU or IOP that is used in a particular implementation.

As before, the device driver 400 can be invoked by an application program 210 either directly (as shown at 250) or indirectly (as shown at 255 & 256). In one embodiment, the invocation is done using a message-passing protocol. In an alternative embodiment, the application program 210 invokes the I2O device driver 400 using a procedure call mechanism. Similarly, the responsive communication from the I2O device driver 400 back to the invoking application program 210 can also be direct (i.e., by bypassing the operating system 220) or indirect (i.e., by routing through the operating system 220).

Figure 5:
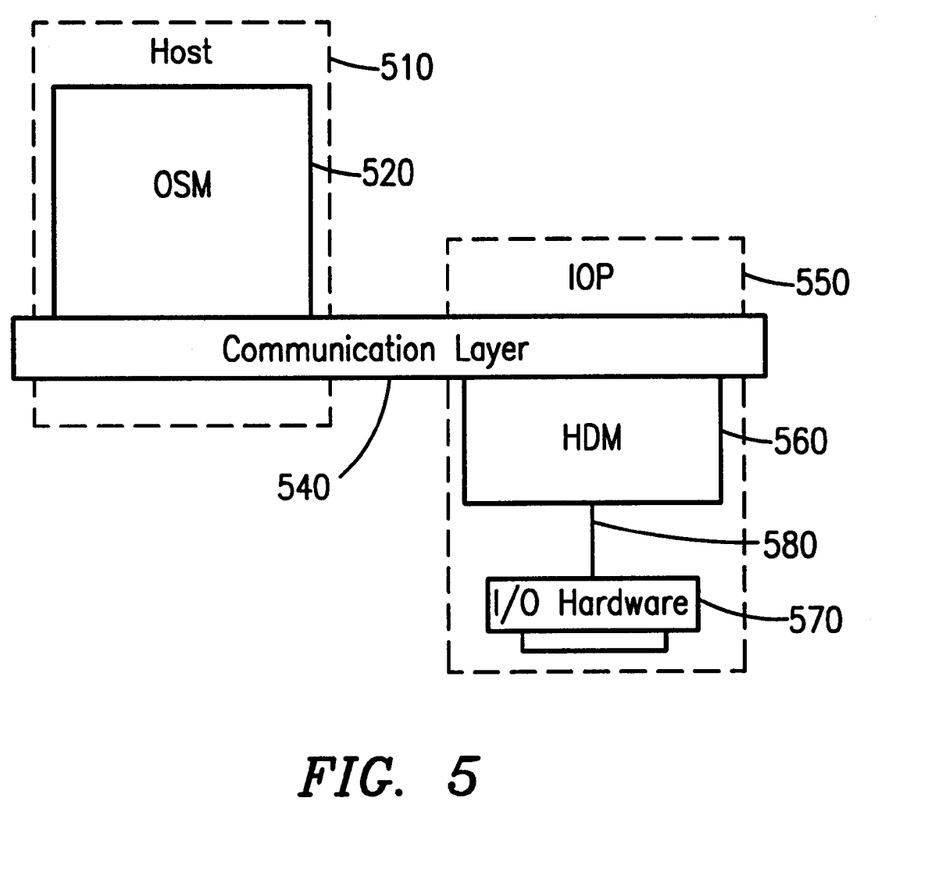
FIG. 5 illustrates the I2O device driver model.

The intelligent input-output (I2O) device driver development model shown in FIG. 4 refines and systematizes the split-driver model of FIG. 4. As shown in FIG. 5, the I2O split-driver model comprises some program code instructions 510 that are resident on a host processor and some program code instructions 550 that are resident on one or more Input-Output Processors (IOPs).

Thus, the I2O split-driver model separates each I/O device driver into an Operating System Services Module (OSM) 520 and a Hardware Device Module (HDM) 560 that communicate over a Communication Layer 540. The Hardware Device Module 560 normally resides on the IOP 550 while the OSM 520 normally resides on or near the Host Operating System 510. The Hardware Device Module 560 communicates with the physical I/O hardware 570 over a communications link 580.

The message passing architecture of the I2O standard has been designed to maximize performance of I/O systems. In one aspect, the I2O message interface allows the operating system to batch I/O requests. This reduces the potential for the CPU stalling during I/O transactions. Permitting the operating system to batch I/O requests also increases the performance benefits of a multiprocessor implementation, e.g., by increasing the scalability of multiprocessor system in terms of transactions per second (TPS).

In another aspect, the I2O message passing architecture also provides a consistent hardware interface. Such a consistent hardware interface simplifies the creation, testing, integration and support of an I2O device driver. In addition, the consistent hardware interface presented by the I2O messaging architecture also makes operating system support pervasive. Furthermore, the I2O hardware interface narrows the requirements for developing a standards-compliant I2O device.

Figure 6:
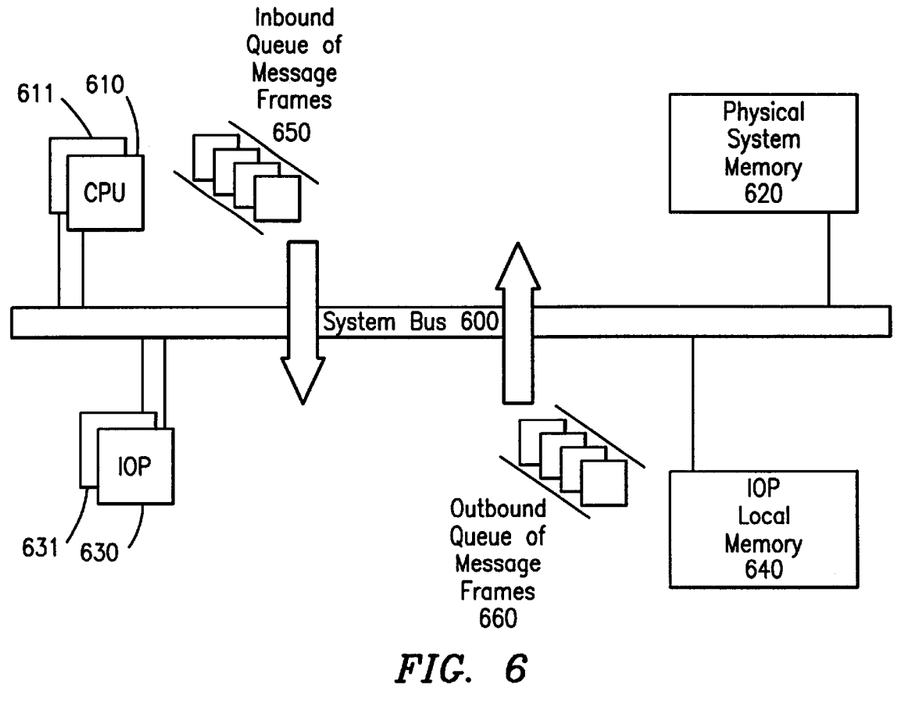
FIG. 6 illustrates the I2O Message Interface.

The I2O message interface is illustrated in FIG. 6. One or more CPUs (two of which are shown in FIG. 6 as elements 610 & 611) communicate with the physical system memory 620 over a system bus 600. In one embodiment of the present invention, the system bus 600 is a PCI bus. Likewise, one or more IOPs 630 & 631 communicate with the IOP local memory 640 (which may be in one or more modules) over the same system bus 600.

As noted earlier, the CPUs and the IOPs communicate with each other by exchanging messages as depicted in FIG. 6. The I2O architecture maintains messages directed from the CPUs 610–611 to the IOPs 630–631 in an inbound queue of message frames 650. Likewise, messages directed at the CPUs 610–611 from the IOPs 630–631 are maintained in an outbound queue of message frames 660.

The I2O Communication Model, when combined with an execution environment and configuration interface, provides an HDM with a host-independent interface. This permits modules to communicate without possessing any knowledge of the underlying bus architecture or system topology. In other words, the plenary message set forms a meta-language for the intercommunication between the various modules that is independent of the bus topology and host operating system interfaces. Thus, the I2O split-driver model provides true device driver portability just like a networking protocol stack, e.g., Transmission Control Protocol/Internet Protocol (TCP/IP), can isolate communicating entities from their implementation details. This has been illustrated in FIG. 6.

The I2O architecture uses a message passing system as its communications model. The I2O communications model is thus analogous to a connection-oriented networking protocol or the OSI seven-layer model, in which two entities exchange messages by using the message layer to set up a connection and exchange data and control signals.

Further details about the I2O Device Driver Development Model can be obtained by reference to U.S. patent application Ser. No. 09/090,641, filed on Jun. 4, 1998, entitled "System and Method for Monitoring Activity Over an Intelligent Input-Output Communications Channel", hereby incorporated by reference herein.

Soft I2O

In some instances, it is often desirable and sometimes necessary to emulate one or more hardware devices in software. One such situation arises when an older piece of software (e.g., a 16-bit application program) needs to be run on a modern (e.g., a 32-bit Windows NT) operating system. In such conditions, it is often the case that the older generation application program often has been designed to operate with a more primitive (i.e., a 16-bit) operating system. In such a case, the older generation application program may invoke an older version of a device driver.

It has been found in practice that users often keep using older versions or older generations of application programs long after an operating system has been upgraded or modernized. In order for the upgraded or modernized operating system to remain compatible with the older generation application program, it is often necessary for the upgraded or modernized operating system to be able to emulate the behavior of one or more prior generations of hardware and/or device drivers.

One way to provide such "backward compatibility" is to emulate older generations of hardware and/or input/output devices using software. In order for such emulation to be compatible with the I2O standard, the emulation must conform to the requirements of this split-driver model. Thus, the emulated device would be associated with one or more emulation modules that would interface to an invoking application program through a I2O-compatible OSM and HDM. The emulation of hardware and/or I/O devices in an I2O-compatible manner is referred to herein as Soft I2O.

Interrupt Signaling in Microprocessor Systems

Intel microprocessors provide two mechanisms for interrupting program execution: interrupts and exceptions. An interrupt is an asynchronous event that is typically triggered by an I/O device. An exception is a synchronous event that is generated when a processor detects one or more predefined conditions while executing an instruction. Exceptions can be further classified into faults, traps and aborts.

Intel microprocessors respond to interrupts and exceptions in essentially the same way. When an interrupt or exception is signaled, the processor halts execution of the current program or task and switches to a handler procedure that has been specifically written to handle the interrupt or exception condition. The processor accesses the handler procedure through an entry in the Interrupt Descriptor Table (IDT). When the handler has completed handling the interrupt or exception, program control is returned to the interrupted program or task. The operating system and/or device drivers normally handle interrupts and exceptions independently from application programs or tasks.

Figure 7:
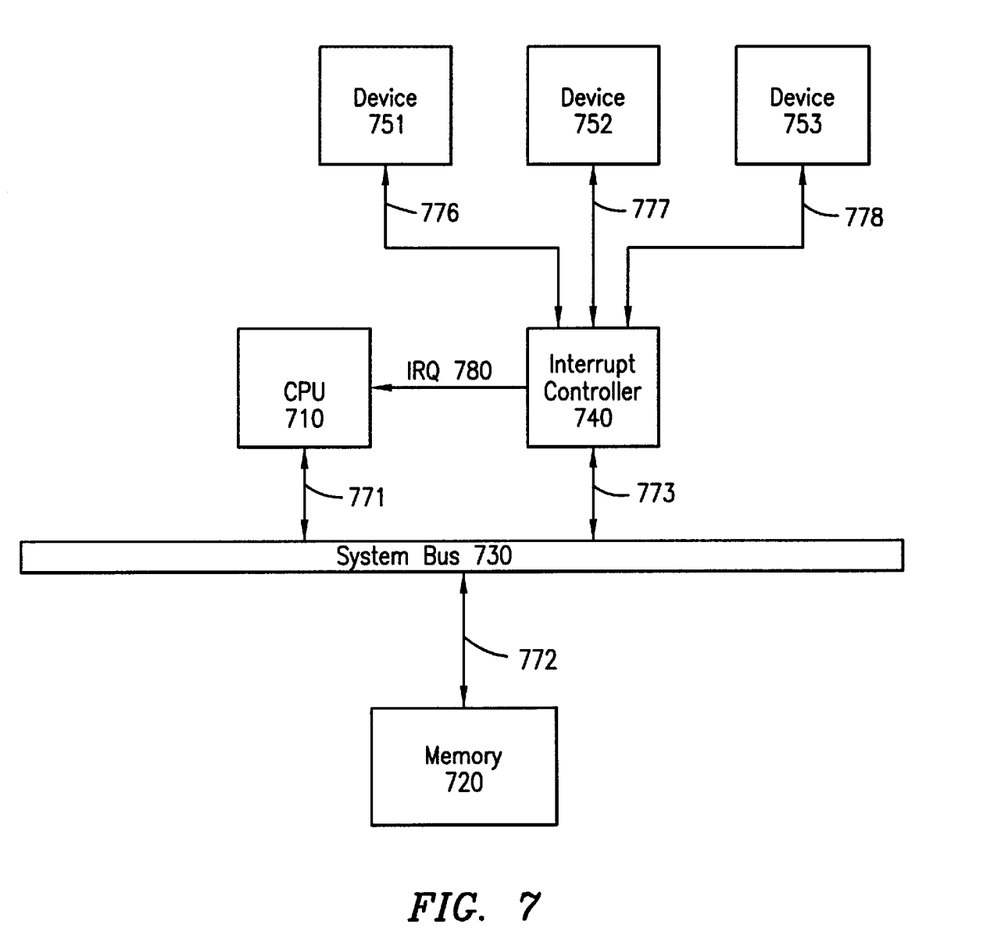
FIG. 7 shows a traditional single CPU computer system where all I/O devices are controlled by an external interrupt controller.

FIG. 7 depicts a traditional uniprocessor computer system in which multiple hardware devices 751–753 interact with a CPU 710 through an interrupt controller 740. The computer system also comprises a memory unit 720 that is accessible to the CPU 710 as well as to the interrupt controller 740 through a system bus 730. As can be seen from FIG. 7, each of the CPU 710, the interrupt controller 740 and the memory 720 can communicate bidirectionally amongst each other over the system bus 730 (as shown at 771–773). The interrupt controller 740, in turn, can communicate with the devices 751–753, as shown at 776–778. Devices obtain the dedicated attention of the CPU 710 by means of an interrupt request (IRQ) signal 780 that is generated by the interrupt controller 740 and received by the CPU 710.

Figure 8:
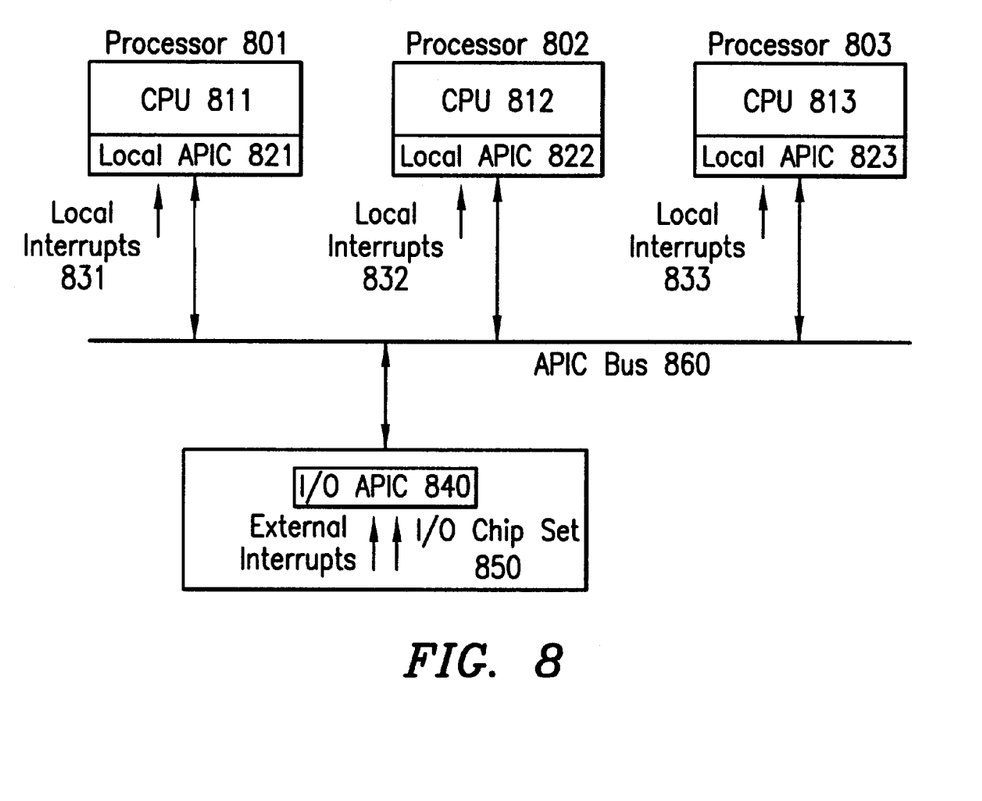
FIG. 8 depicts a multiprocessor computer system which each processor has an embedded Advanced Programmable Interrupt Controller (APIC) which communicate with each other and with an external APIC over a specialized serial buss.

FIG. 8 shows the signal flow between an I/O APIC 840 and local APICs 821–823 belonging to processors 801–803, respectively. As noted earlier, processors 801, 802 & 803 comprise CPUs 811, 812 & 813, respectively, along with local APICs 821, 822 & 823. The local APICs 821–823 communicate with the external I/O APIC 840 over an APIC bus 860. As shown in FIG. 8, each of the local APICs 821–823 is capable of receiving local interrupts 831–833.

All I/O APICs and local APICs communicate over an APIC bus 860. The APIC bus is a 3-line serial bus that takes multiple clock cycles to transmit a full word of data. Two of the lines are open-drain (wired-OR) that are used for data transmission while the third line carries a clock signal. Being connected to a common APIC bus, the local APICs 821–823 and the I/O APIC 840 have to arbitrate for permission to send a message over the APIC bus 860.

As noted earlier, logically, the APIC bus is a wired-OR connection, enabling more than one local APIC to send messages simultaneously. Each APIC issues its arbitration priority at the beginning of each message and one winner is collectively selected following an arbitration round. At any given time, a local APIC's arbitration priority is a unique value ranging between 0 and 15. The arbitration priority of each local APIC is dynamically redefined after each successfully transmitted message in order to maintain fairness in handling interrupts.

Figure 9:
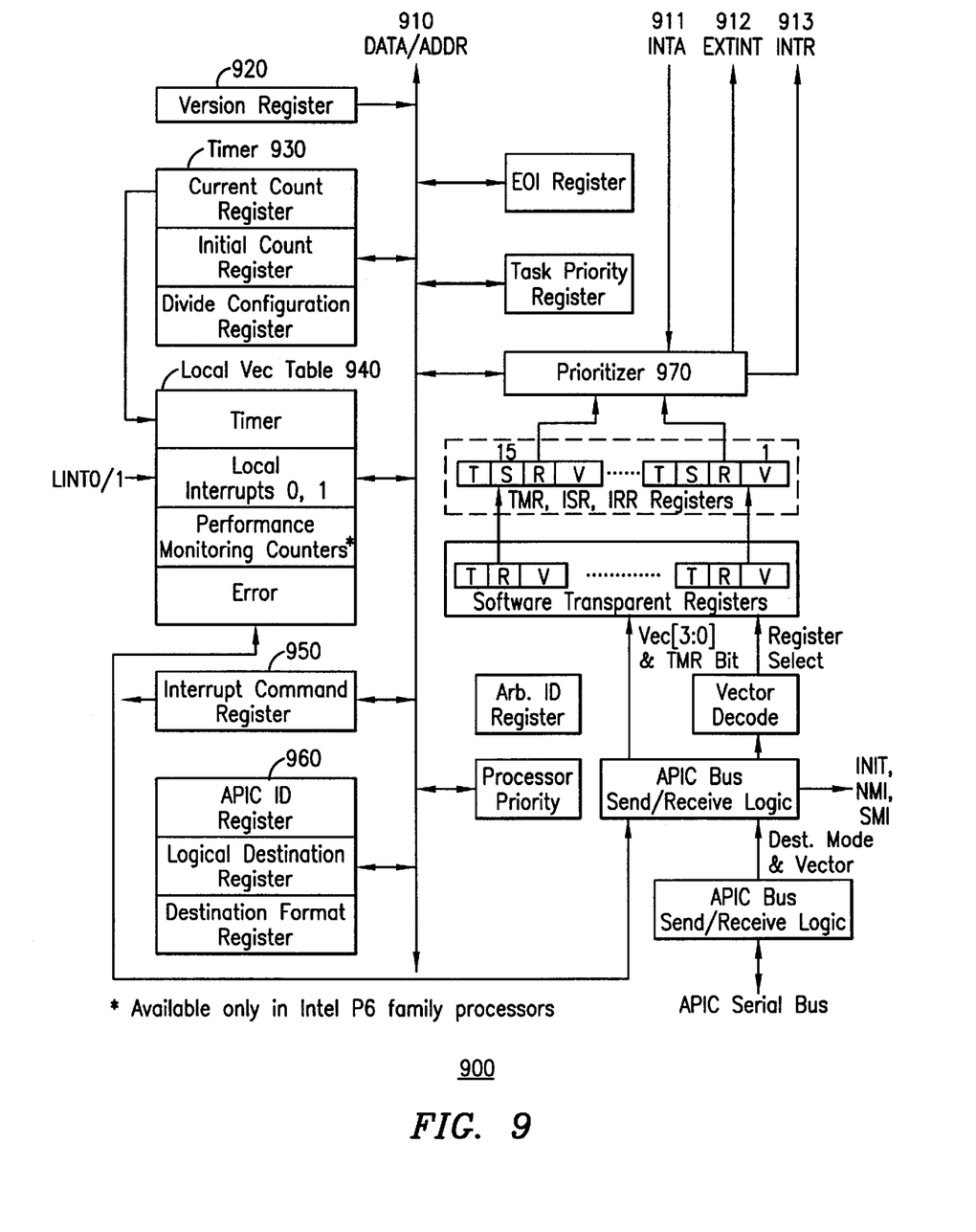
FIG. 9 shows the structure of a local APIC that is embedded within Intel's Pentium-class (and subsequent generations of) microprocessors.

FIG. 9 shows the internal structure of local APIC is current generations of Intel microprocessors. As shown in FIG. 9, the local APIC 900 comprises an internal data/address bus 910 that interconnects a plurality of registers and other devices. A Version Register 920 contains information about the version number of the microprocessor. A Timer unit 930 is used for actions requiring a timer. The local APIC 900 also comprises a Local Vector Table 940, an Interrupt Command Register 950 and a set of additional registers 960.

A Prioritizer 970 is used to select between multiple contemporaneous interrupts and to order the handling of the interrupts in a predetermined order. The local APIC 900 generates the EXTINT signal 912 and the INTR signal 913 as shown in FIG. 9. The local APIC 900 is also responsive to the receipt of the INTA signal 911. In multiprocessor architectures, the local APICs of each of the multiple processors communicate with each other over the APIC serial bus 980 as mentioned earlier.

The APIC architecture supports two mechanisms for selecting the destination processor for an interrupt: static and dynamic. Static distribution is used to access a specific processor in the network. Using this mechanism, the interrupt is unconditionally delivered to all local APICs that match the destination information supplied with the interrupt.

Dynamic distribution, on the other hand, assigns an incoming interrupt to the lowest priority process which is generally the least busy processor. Using dynamic distribution, only the "lowest priority" delivery mode is permitted. From all of the processors listed as being the destination, that processor is selected whose current arbitration priority is found to be the lowest as specified in the Arbitration Priority Register (APR). In the lowest priority mode, if a focus processor exists, it is permitted to accept an interrupt regardless of its priority. A processor is said to be the focus of an interrupt if it is servicing the interrupt, or if it has a pending request for that interrupt.

The APICs use three types of messages: End-of-Interrupt messages, short messages and non-focused-lowest-priority messages. Local APICs send 14-cycle E.I. messages to the I/O APIC to indicate that a level triggered interrupt has been accepted by the processor. Short 21-cycle messages are used for sending fixed, NMI, SMI, INIT, startup, EXTINT, and lowest-priority-with-focus interrupts. When a focus processor is not present, a 34-cycle Nonfocused Lowest Priority messages are transmitted in the lowest priority delivery mode.

Figure 10:
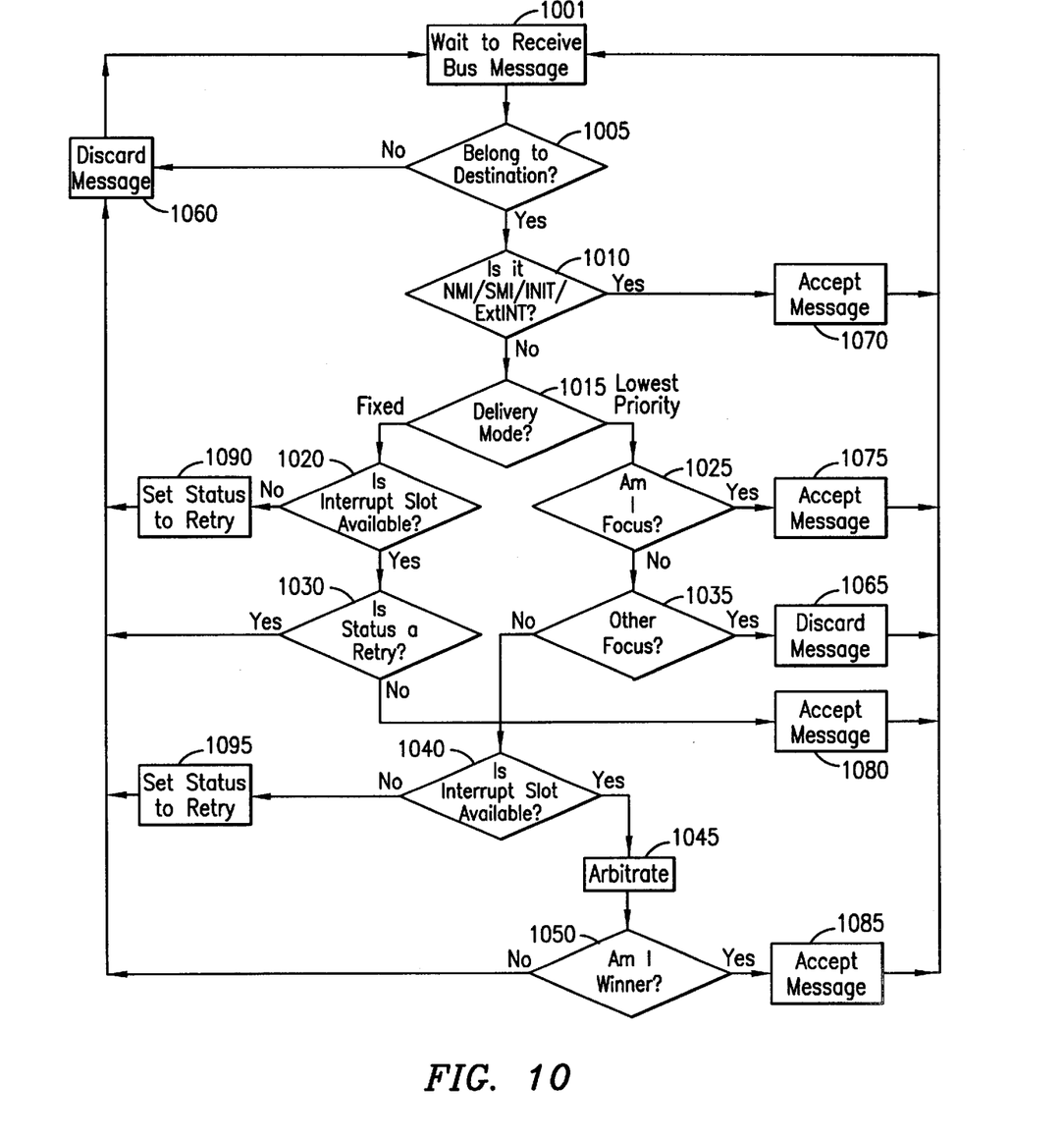
FIG. 10 is a flow chart illustrating the interrupt acceptance algorithm for a local APIC.

FIG. 10 is a flow chart depicting the algorithm used for accepting, handling and dispatching interrupts in a local APIC. A local APIC 900 always starts out in the wait state 1001 when it is waiting to receive a bus message. The local APIC 900 first tests a received bus message as shown at 1005, to determine whether the message is addressed to itself. If the answer is in the negative, the message is discarded as shown at 1060. If on the other hand, the message is found to be directed to the local APIC, the local APIC then checks the bus message to see whether it is a Non Maskable Interrupt (NMI) (or an analogous signal) as shown at 1010. If so, the message is accepted as shown at 1070. If not, the local APIC next inspects the delivery mode as shown at 1015.

If the fixed delivery mode was specified in the received bus message, the local APIC next checks at 1020 to see if an interrupt slot is found to be available. If no interrupt slot is available, the local APIC sets the status of the message to retry as shown at 1090 before discarding the message at 1060. If on the other hand, an interrupt slot is found to be available at 1020, the local APIC next checks to see if the status is a retry at 1030. If the status is found to be a retry, the local APIC discards the message at 1060. If the status is not found to be a retry at 1030, the local APIC accepts the message at 1080.

If the received bus message is found at 1015 to be in the "lowest priority" delivery mode, the local APIC next checks at 1025 to determine whether it is the focus of the request. If so, the local APIC accepts the message at 1015. If not, the local APIC next checks to see if a different APIC is the focus processor. If so, the local APIC discards the message at 1065. If not, the local APIC then checks at 1040 to see whether an interrupt slot is available. If not, the status of the message is set to retry at 1095 and the message is discarded at 1060. If on the other hand, an interrupt slot is found to be available at 1040, then the arbitration procedure is invoked at 1045. If the local APIC is found to be the winner of this arbitration round at 1050, it accepts the message at 1085. If not, it discards the message at 1060.

Following either the acceptance of the message (at 1070, 1075, 1080 or 1085) or the discarding of a message (at 1060 or 1065), the local APIC returns to the wait state of 1001 and awaits the reception of the next bus message over the three line serial APIC bus.

Figure 11:
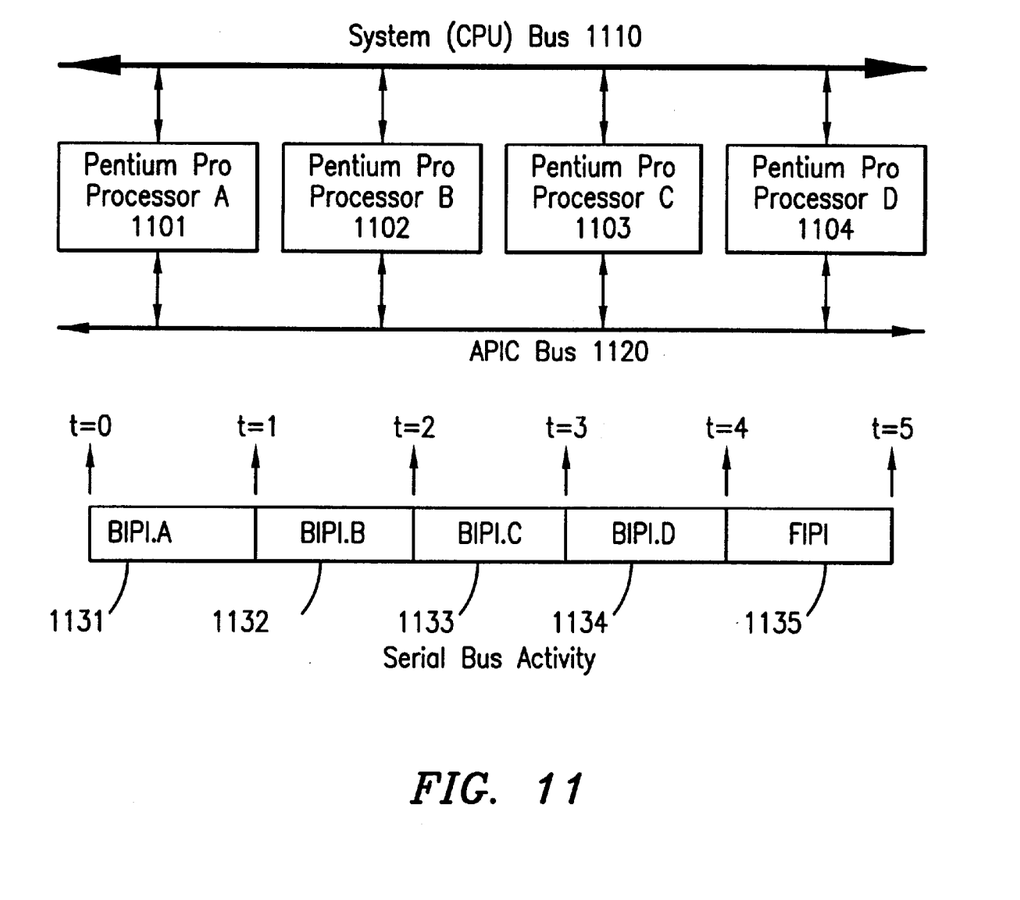
FIG. 11 shows the multiprocessor initialization protocol algorithm used in multiprocessor computer systems.

FIG. 11 shows the multiprocessor initialization protocol algorithm that is used to determine which processor in a multiprocessor system is to be the bootstrap processor (BSP). The algorithm used essentially implements a "race for the flag" mechanism using the APIC bus for atomicity. The multiprocessor initialization algorithm is based on the fact that one and only one message is allowed to exist on the APIC bus at any given time and that once the message is issued, it will complete since APIC messages are guaranteed to be atomic. In the symmetric multiprocessor system depicted in FIG. 11, four Pentium Pro-class processors A, B, C, and D (shown as 1101–1104) communicate amongst each other over a system CPU bus 1110 and an APIC bus 1120.

As shown in the lower part of FIG. 11, the first processor to complete its initialization is deemed the bootstrap processor (BSP). The BSP issues a Boot Interprocessor Interrupt (BIPI) message that de facto renders all other processors in the system as application processors that need to wait until they receive a Startup Interprocessor Interrupt (SIPI) signal from the BSP. After establishing priority as the BSP relative to the other processors in a multiprocessor system, the BSP then issues the Final boot Interprocessor Interrupt (FIPI) command. Later, after completing the initialization sequence, the BSP then issues a Startup Interprocessor Interrupt (SIPI) command.

Special Issues in Interrupt Handling

Special problems arise in interrupt handling in certain contexts. For example, in order to provide for redundancy and failure assistance, the Intel architecture recommends that multiprocessor systems be implemented with dynamically selected bootstrap processors (BSPs). In such a situation it is obviously hard to predict a priori which of two or more processors will become the bootstrap processor.

Since the devices controlled by the I2O processors route interrupts to the I2O processors and similarly since devices controlled by host processors route interrupts to the host processors, and since associated software modules invoking or responding to such devices need not necessarily be the same processor, it is easy to visualize situations where I/O devices need to generate an interrupt on a processor other than the corresponding controlling processor.

This problem is accentuated under the I2O paradigm because of the concomitant partitioning of each device driver into an operating system module (OSM) and a hardware device module (HDM). This is because the OSM and HDM need not execute on the same processor. This gives rise to the twin problems of routing an interrupt from a physical I/O device to the appropriate HDM (which need not be executing on the same local APIC or local processor) and of routing messages from an HDM to its associated OSM. Similar problems arise when hardware devices are being emulated in software. The problems can be generically categorized as involving the matching of a physical interrupt to the appropriate device driver.

Hardware Interrupt Simulation on SMPs Running Windows NT

In the preferred embodiment of the present invention these problems are resolved by designing a customized kernel mode device driver that runs under the Windows NT operating system. Depending upon the targeted application, this device driver needs to be loaded prior to any other system driver for which it is expected to provide services for. The present invention provides a method to simulate hardware interrupts using the interprocessor interrupt (IPI) mechanism of the local APIC in each of the processors of a multiprocessor system. The procedure for using the local APIC to generate a hardware interrupt request (IRQ) is set forth below.

First, one needs to determine the IRQ vector that the system device driver expects to connect its Interrupt Service Routine (ISR) to. This is obtained by executing the HalGetInterruptVector( ) routine. If there is no real device for the driver to control (e.g., in the case of emulation) then it might be necessary to hook or intercept the HalGetInterruptVector( ) and the IOConnectInterrupt( ) Windows NT routines. The method of intercepting various HAL and kernel routines may be found in co-pending U.S. patent application, Ser. No. 09/152,597, filed on Sep. 14, 1998, which issued as U.S. Pat. No. 6,275,893 on Aug. 14, 2001, entitled "Method and Apparatus For Providing Seamless Hooking and Intercepting of Selected Kernel and HAL Exported Entry Points" hereby incorporated by reference herein.

Once the ISR of the device driver has been connected to the appropriate interrupt vector entry in the IDT, the vector number is combined with the local APIC constant and a 32-bit write is performed to the lower part of the Interrupt Command Register (ICRL) register of the local APIC. The local APIC constant represents an encoding of the following configuration selections:

Low Priority delivery mode

Logical destination mode

Level assert

Edge triggered

Destination all excluding Self

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. In a multiprocessor computer system, a method of simulating a hardware interrupt on a nonlocal processor responsive to the completion of a task or status inquiry by a hardware device, said method comprising the steps of:

connecting a first processor, a second processor and an input/output interface to a shared bus, said shared bus being optimized for relaying interrupt information between the various devices connected to it;

using a device driver to issue a command to a hardware device connected to said first processor;

generating an interrupt signal upon the completion of the task by said hardware device, and transmitting said interrupt signal to said first processor;

relaying said interrupt signal from said first processor to said second processor over said shared bus; and converting said relayed interrupt signal into a hardware interrupt signal at said second processor.

2. The hardware interrupt simulation method of claim 1 wherein the operating system environment used on said multiprocessor computer system is a multi-threaded operating system.

3. The hardware interrupt simulation method of claim 1 wherein the operating system environment used on said multiprocessor computer system is a Microsoft Windows NT operating system.

4. The hardware interrupt simulation method of claim 1 wherein the operation of said hardware device is emulated in software.

5. The hardware interrupt simulation method of claim 1 wherein said first processor, said second processor, said input/output interface and local memory are also connected to a shared parallel bus, said shared parallel bus being capable of carrying address and data information between the various devices connected to it.

6. The hardware interrupt simulation method of claim 5 wherein said shared parallel bus is a 32-bit bus.

7. The hardware interrupt simulation method of claim 5 wherein said shared parallel bus is a 64-bit bus.

8. The hardware interrupt simulation method of claim 1 wherein said first processor and said second processor are both at least functionally equivalent to microprocessors of the Intel Pentium class of microprocessors.

9. The hardware interrupt simulation method of claim 8 wherein said shared bus is a 3-wire Advanced Programmable Interrupt Controller (APIC) bus.

10. The hardware interrupt simulation method of claim 1 wherein said shared bus is a 3-wire bus.

11. The hardware interrupt simulation method of claim 1 wherein said device driver is compliant with the I2O messaging protocol.

12. The hardware interrupt simulation method of claim 1 wherein said I2O-compliant device driver for an input/output (I/O) device of said multiprocessor computer system is developed by using a method comprising the steps of:

partitioning the functionality of the device driver into at least two software modules, including an Operating System Services Module (OSM) and a Hardware Device Module (HDM), said OSM comprising program code instructions that are operating-system-specific, and said HDM comprising program code instructions that are specific to the I/O device;

defining a standardized messaging protocol for intercommunication between said software modules;

maintaining messages from said OSM in a first message queue;

maintaining messages from said HDM in a second message queue; and exchanging messages between said software modules over a communications layer.

13. The hardware interrupt simulation method of claim 12 wherein said step of converting said relayed interrupt signal into a hardware interrupt signal at said second processor further comprises the steps of:

determining the interrupt request vector that is associated with said device driver;

using said interrupt request vector to invoke an associated interrupt service routine;

using said interrupt service routine to obtain an associated a vector number in an interrupt descriptor table;

combining said vector number with a processor-specific constant to obtain an auxiliary dataword; and performing a write operation to store said auxiliary dataword into an interrupt control register.

14. The hardware interrupt simulation method of claim 13 wherein said processor-specific constant represents an encoding of at least the following system configuration selections:

the Low Priority Delivery Mode is selected;

Logical Destination Mode is selected;

Level Assertion is selected;

Edge Triggering is selected; and

Destination is set to All Excluding Self.

15. In a multiprocessor computer system, a system for of simulating a hardware interrupt on a nonlocal processor responsive to the completion of a task or status inquiry by a hardware device, said system comprising:

a first processor, a second processor and an input/output interface that are connected to a shared bus, said shared bus being optimized for relaying interrupt information between the various devices connected to it;

a device driver for issuing a command to a hardware device connected to said first processor;

means for generating an interrupt signal upon the completion of the task by said hardware device, and a shared bus for transmitting said interrupt signal to said first processor;

means for relaying said interrupt signal from said first processor to said second processor over said shared bus; and means for converting said relayed interrupt signal into a hardware interrupt signal at said second processor.

16. The hardware interrupt simulation system of claim 15 wherein said first processor and said second processor are both at least functionally equivalent to microprocessors of the Intel Pentium class of microprocessors.

17. The hardware interrupt simulation system of claim 16 wherein said shared bus is a 3-wire Advanced Programmable Interrupt Controller (APIC) bus.

18. The hardware interrupt simulation system of claim 15 wherein said device driver is compliant with the I2O messaging protocol.

19. The hardware interrupt simulation system of claim 15 wherein said means for converting said relayed interrupt signal into a hardware interrupt signal at said second processor additionally comprises the following:

means for determining the interrupt request vector that is associated with said device driver;

means for invoking an associated interrupt service routine using said interrupt request vector;

means for generating an associated a vector number in an interrupt descriptor table using said interrupt service routine;

means for combining said vector number with a processor-specific constant to obtain an auxiliary dataword; and means for performing a write operation to store said auxiliary dataword into an interrupt control register.

20. The hardware interrupt simulation system of claim 19 wherein said processor-specific constant represents an encoding of at least the following system configuration selections:

the Low Priority Delivery Mode is selected;

Logical Destination Mode is selected;

Level Assertion is selected;

Edge Triggering is selected; and

Destination is set to All Excluding Self.

* * * * *